United States Patent

Crisler

[15] 3,660,047
[45] May 2, 1972

[54] PRODUCTION OF PLUTONIUM FORMATE AND PLUTONIUM DIOXIDE

[72] Inventor: Larry R. Crisler, Arvada, Colo.

[73] Assignee: The United States of America as represented by the United States Atomic Energy Commission

[22] Filed: Mar. 18, 1970

[21] Appl. No.: 20,779

[52] U.S. Cl................................23/344, 23/332, 260/429.1
[51] Int. Cl.........................................................C01g 56/00
[58] Field of Search..........................23/344, 332; 260/429.1

[56] References Cited
OTHER PUBLICATIONS

Drummond et al. The Preparation and Properties of some Plutonium Compounds International Cong. of Pure and Applied Chem. 1957, Paris pp. 379, London, Butterworth Publ. 1958.

*Primary Examiner*—Carl D. Quarforth
*Assistant Examiner*—F. M. Gittes
*Attorney*—Roland A. Anderson

[57] ABSTRACT

Production of plutonium dioxide by forming the novel compound plutonium formate and heating the plutonium formate, at temperature from about 250° C. to about 350° C., is described.

2 Claims, 2 Drawing Figures

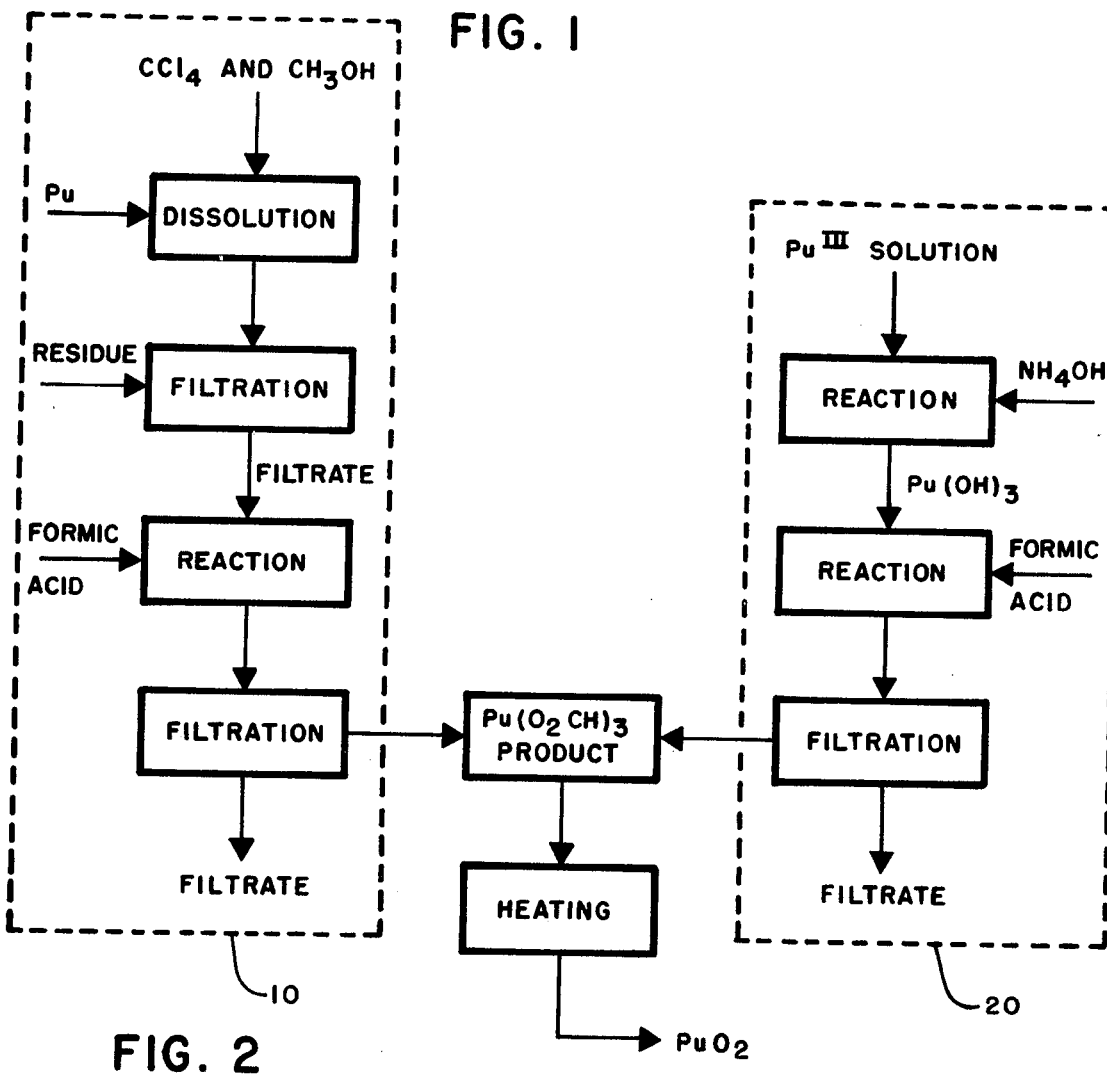
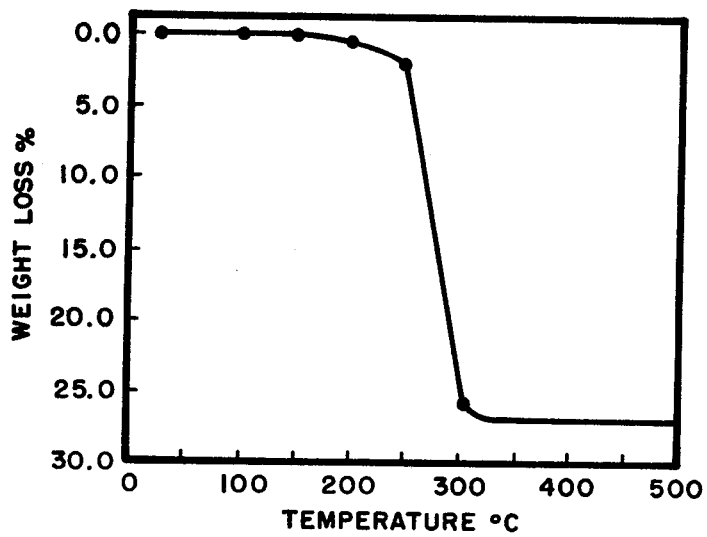
INVENTOR.
LARRY R. CRISLER

3,660,047

PRODUCTION OF PLUTONIUM FORMATE AND PLUTONIUM DIOXIDE

BACKGROUND OF INVENTION

For convenience of description the term "plutonium dioxide" is used herein to include the most common oxide of plutonium with plutonium to oxygen ratio of about 1 to 2, as well as oxides of plutonium having ratios somewhat less than 1 to 2.

Plutonium dioxide has a wide range of uses in nuclear and other industries. For example, plutonium dioxide is involved in the production and purification of plutonium metal and in the recovery of plutonium from various waste or by-product materials. Certain isotopes of plutonium may be used in the form of plutonium dioxide for fissionable fuels in nuclear reactors and as heat sources for electric generators or for other heat energy applications.

Previous processes for forming plutonium dioxide have often resulted in the production of a plutonium dioxide product having highly refractory-type properties due to the high temperatures needed to prepare the plutonium dioxide. Such highly refractory-type plutonium dioxides may be difficult to use in those applications where it is desirable to react the plutonium dioxide with some other chemicals or reactives, such as in the fluorination of plutonium dioxide or in the dissolution of plutonium dioxide in nitric acid or other acids in certain recovery processes. Thus, it would be desirable to produce a plutonium dioxide having low refractory characteristics wherein the production thereof is at relatively low temperatures.

SUMMARY OF INVENTION

It is therefore an object of this invention to provide a relatively low temperature process for obtaining plutonium dioxide.

It is a further object of this invention to provide a new plutonium compound which may be oxidized at a low temperature to plutonium dioxide.

Various other objects and advantages will appear from the following description of the invention, and the most novel features will be particularly pointed out hereinafter in connection with the appended claims. It will be understood that various changes in the details, materials and process steps, which have been herein described and illustrated in order to explain the nature of the invention, may be made by those skilled in the art.

The invention comprises forming the novel compound plutonium formate by various processes and heating the plutonium formate so formed at a temperature of from about 250° C. to about 350° C. (optimum temperature may be about 350° C. to produce reasonable non-refractory oxide at a relatively high rate while process at lower temperature proceeds at slower rate).

DESCRIPTION OF DRAWING

The present invention is illustrated in the accompanying drawing wherein:

FIG. 1 is a block diagram of processes for forming plutonium formate and plutonium dioxide therefrom; and FIG. 2 is a graph of weight loss versus temperature as plutonium formate is heated to its decomposition temperature.

DETAILED DESCRIPTION

It has been found that plutonium dioxide may be produced by the processes depicted in FIG. 1. The processes include forming the new compound plutonium formate by either of the routes shown within the dotted lines 10 and 20.

The route shown in dotted line 10 includes the steps of dissolving pure plutonium metal in a carbon tetrachloride-methanol mixture having volume percent ratios of from about 1 – 9 to 9 – 1, filtering the resulting solution to remove any precipitate or residue, reacting the filtrate with formic acid (a commercial reagent grade concentrated acid preferably about 90 percent nominal concentration) and filtering the solution to recover a precipitate formed therein. This precipitate is anhydrous plutonium formate. In the dissolution step, gas may be evolved initially which will cease after a short time, leaving a clear blue-green solution with a small amount of insoluble black residue. As stated, this residue may be removed by filtration, such as by vacuum filtration, and the concentrated formic acid added and stirred in the filtrate. The precipitate, which may be blue in color, may be formed immediately and separated from the solution by appropriate vacuum filtration or the like. The filtered precipitate, which is plutonium (III) formate comprising about 30 percent or more (depending on process conditions) of the initial plutonium present in solution, may then be washed one or more times with methanol containing a small amount of formic acid to remove soluble impurities that might be present. The reaction sequence for route 10 is as follows;

$$Pu + CCl_4 + CH_3OH \rightarrow \text{Blue solution} + H_2 \uparrow$$
$$\text{Blue solution} + HO_2CH \rightarrow \underline{Pu(O_2CH)_3} \downarrow + \text{unidentified products}$$

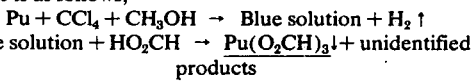

With the preferred route shown in dotted line 20, the formate may be formed by providing a solution of plutonium (III) ions such as by dissolving plutonium in concentrated hydrochloric acid, hydriodic acid, or perchloric acid. The plutonium (III) ions may be reacted in solution with concentrated ammonium hydroxide or sodium hydroxide to a basic pH of about 8 to 14 to produce plutonium (III) hydroxide. The plutonium (III) hydroxide should remain under the liquid level to minimize the amount of oxidation that can take place with the formation of the plutonium (IV) species, decreasing the yield of plutonium (III) formate. Concentrated formic acid may then be added to the plutonium (III) hydroxide adjusting the pH to approximately 5 (may be pH 5 to 1, dependent on the buffer effect of contained salts) while reacting therewith. The solid material product, having a robin egg blue coloring, may then be filtered from the solution and washed with concentrated formic acid to remove residual ammonium chloride and ammonium formate (or sodium chloride and sodium formate) and any other soluble residual materials. The solid material product is anhydrous plutonium (III) formate comprising about 100 percent of the initial plutonium present in solution. Air drying may be desirable to remove adsorbed water. The reaction sequence for route 20 is as follows;

$$Pu + 3HCl \rightarrow Pu(III) + 3Cl^- + 3/2\ H_2 \uparrow$$
$$Pu(III) + 3NH_4OH \rightarrow \underline{Pu(OH)_3} \downarrow + 3NH_4^+$$
$$Pu(OH)_3 + 3HO_2CH \rightarrow \underline{Pu(O_2CH)_3} \downarrow + 3H_2O.$$

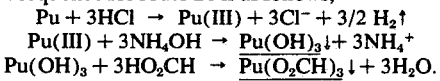

A plutonium coupon of about 1.1059 grams was reacted with a 5.0 milliliter $CCl_4/CH_3OH$ mixture (about 50/50 volume percent). After the reaction was completed (about 1 hour), about 20 drops of 88 to 90 percent reagent grade formic acid was added to the solution and a precipitate formed. By reagent grade acid is meant a certified 88 to 90 percent concentration whereas any concentrated acid of 70 to 100 percent concentration may be used. After adding about 5 milliliters of methanol to the solution, an additional 0.5 milliliter of reagent grade formic acid was added to increase precipitation. The precipitate was plutonium formate and included about 30 percent of the initial plutonium in the coupon.

About 32.9 grams of electrorefined plutonium was reacted with about 150 milliliters 10N HCl to yield a plutonium (III) solution. Any residues present may be removed by vacuum filtration, if desired. Half of this solution was reacted with 8N NaOH to form a solution with $Pu(OH)_3$. Reagent grade formic acid was added to the $Pu(OH)_3$ solution to a pH of 5 to produce plutonium formate precipitate which was removed by filtration. The plutonium (III) formate was then washed with concentrated formic acid.

The other half of the plutonium (III) solution was reacted with concentrated $NH_4OH$ to a pH of 8 and the resulting solution reacted with reagent grade formic acid to a pH of 5. Plutonium (III) formate was formed. The plutonium formate formed by these latter two processes included about 100 percent of the initial plutonium present in the plutonium (III) solution.

The plutonium formate, having a formula $Pu(O_2CH)_3$, may have an X-ray diffraction powder pattern lattice constant, index based on a hexagonal cell, of $a = 10.51$ angstrom; $c = 4.01$ angstrom and $c/a = 0.3815$. The plutonium (III) formate spectrum may have the following tentative bands assigned;

| | |
|---|---|
| Symmetrical C—O bend | 779 cm$^{-1}$ |
| Out-of-plane C—H bend (would be 1080 cm$^{-1}$) | too weak to determine |
| Symmetrical C—O stretch | 1350 cm$^{-1}$ |
| In plane C—H bend | 1401 cm$^{-1}$ |
| | 1423 cm$^{-1}$ |
| Symmetrical C—O stretch | 1585 cm$^{-1}$ |
| C—H stretch | 2910 cm$^{-1}$ |

The plutonium formate so formed and having these characteristics may be decomposed by heating in an appropriate air or gas atmosphere and environment to plutonium dioxide in the temperature range 250° to 350° C. by the following proposed route;

$$4Pu(O_2CH)_3 + Heat \rightarrow 4 PuO_2 + 5CO + 4CO_2 + H_2O + H_2\uparrow + HCOOCH_3 + CH_4\uparrow$$

This thermal decomposition is depicted in FIG. 2 wherein the plutonium formate is placed in an alumina crucible at a heating rate at about 6° C. per minute within an air flow of about 1.8 liters per hour. The decomposition may proceed without objectionable stable intermediate plutonium compounds being formed.

The relatively low temperature thermal decomposition (in range of from about 250° to 350° C. though the optimum temperature may be about 350° C. to produce reasonably non-refractory oxide at a relatively high rate) is very desirable, in lieu of temperatures upwards from about 500° C., as there results much less severe corrosion of apparatus, less difficulty with excess heat removal, minimization of plutonium adherence, more readily dissolvable product, etc.

What is claimed is:

1. A process for producing plutonium dioxide comprising dissolving plutonium in a mixture of carbon tetrachloride and methanol at a volume percent ratio of from about 1–9 to about 9–1, mixing concentrated formic acid with said solution to form a plutonium (III) formate precipitate, filtering said precipitate, and heating said plutonium (III) formate at a temperature of from about 250° C. to about 350° C. to form plutonium dioxide.

2. The process of claim 1 wherein said plutonium (III) formate is washed with a dilute mixture of formic acid in methanol before heating thereof.

* * * * *